Jan. 23, 1951     C. H. WHITCROFT     2,538,998
SUSPENDED CARRIER
Filed Feb. 18, 1946     2 Sheets-Sheet 1
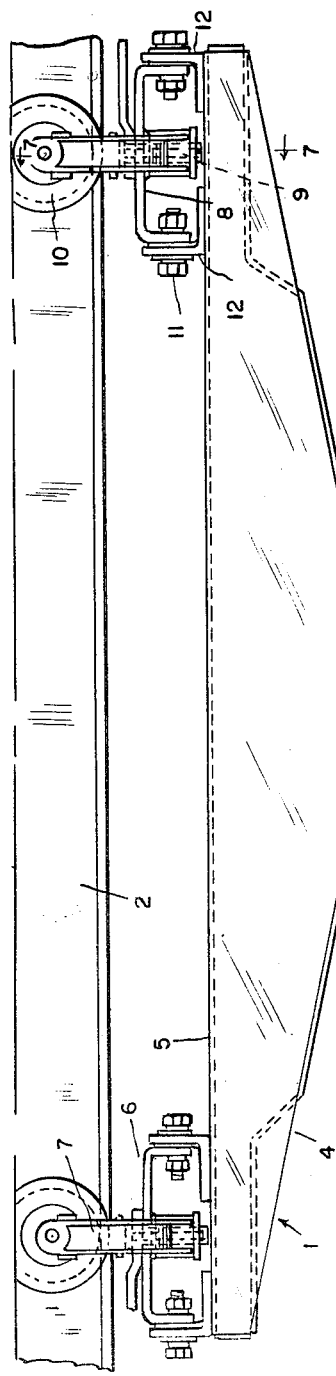
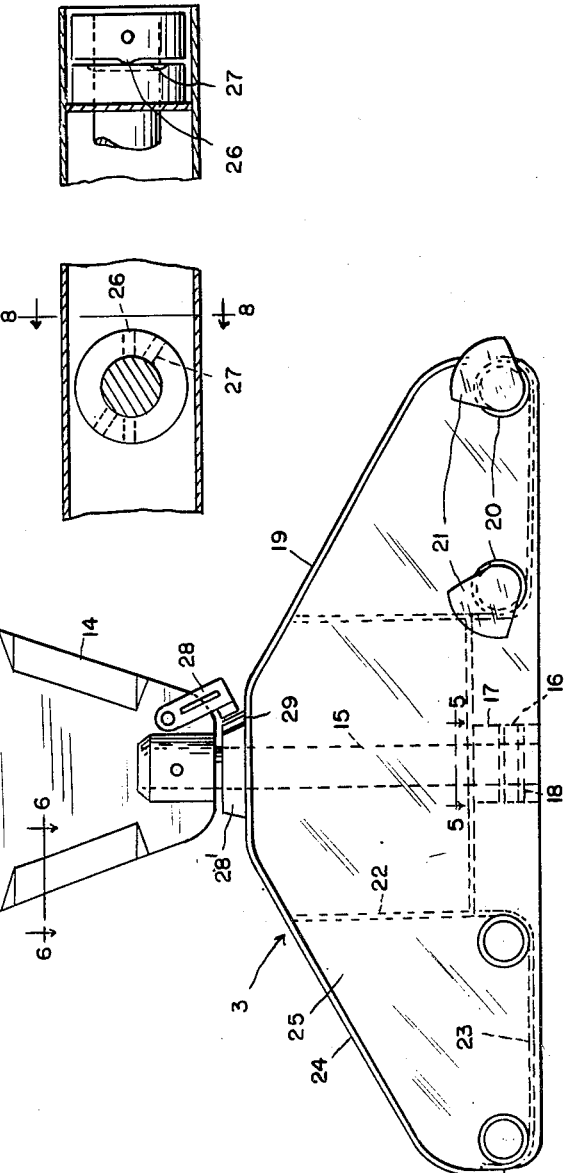
*INVENTOR.*
CLARENCE H. WHITCROFT
BY
ATTORNEYS Jan. 23, 1951 C. H. WHITCROFT 2,538,998
SUSPENDED CARRIER
Filed Feb. 18, 1946 2 Sheets-Sheet 2
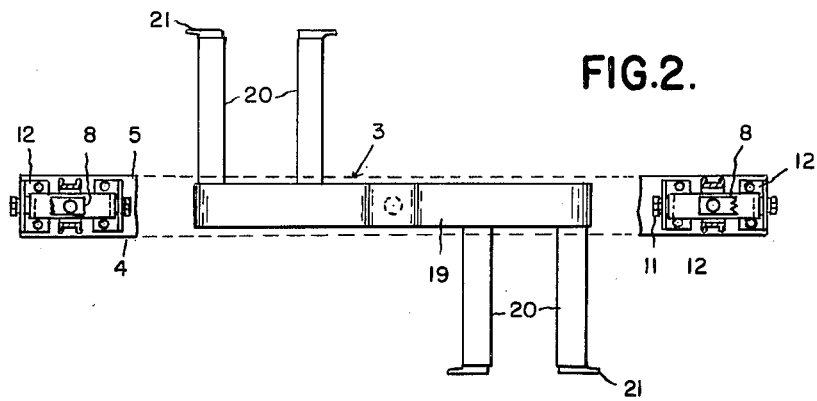
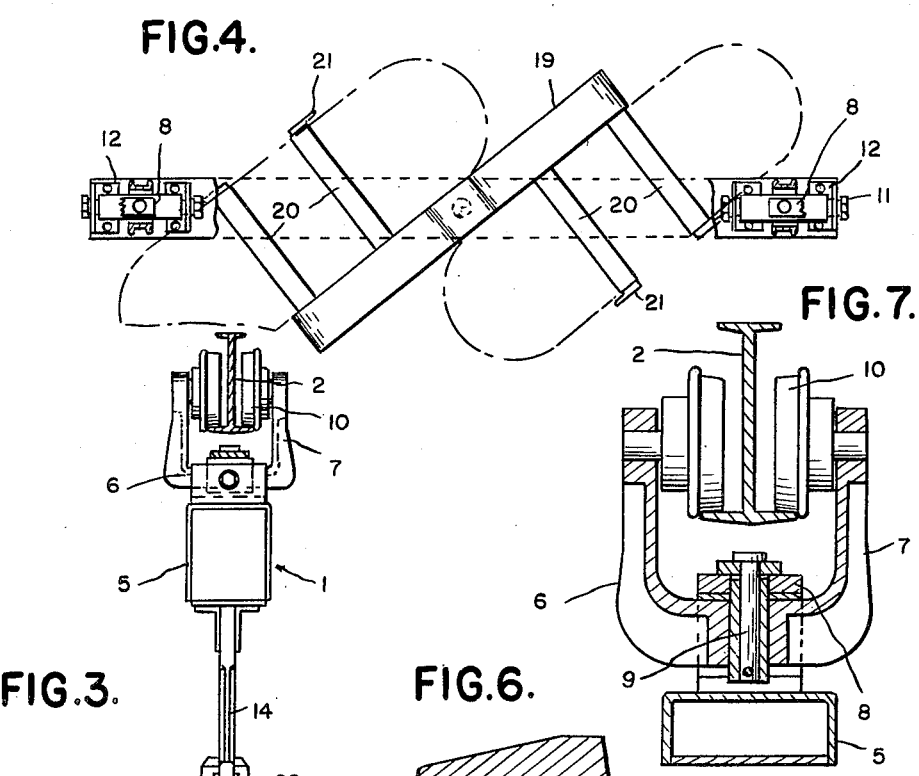
INVENTOR.
CLARENCE H. WHITCROFT
BY
ATTORNEYS Patented Jan. 23, 1951

2,538,998

UNITED STATES PATENT OFFICE 2,538,998

SUSPENDED CARRIER

Clarence H. Whitcroft, Highland Park, Ill., assignor to Mechanical Handling Systems, Inc., Detroit, Mich., a corporation of Michigan Application February 18, 1946, Serial No. 648,388

2 Claims. (Cl. 198—177)

The invention relates to carriers for work elements and refers more particularly to carriers for annular work elements, such as tire casings.

The invention has for one of its objects to provide an improved carrier which is constructed to support a work element in balanced relation to the carrier.

The invention has for another object to provide an improved carrier having a support and a hanger which is angularly movable relative to the support to carry one or a plurality of work elements in balanced relation.

The invention has for still another object to provide a carrier in which the support comprises trolley means movable along a monorail or single track and a supporting member suspended from the trolley means to swing transversely of the monorail and the hanger is angularly movably suspended from the supporting member so that both the hanger and the supporting member may be placed in balance regardless of the number of work elements carried by the hanger.

The invention has for further objects to provide a carrier in which the supporting member has a relatively thin guiding plate whereby the housing through which the hanger passes and in which the processing of the work element takes place may have a relatively narrow slot for passage of the plate, thereby reducing the possibility of escape of the processing material; and to provide a carrier having an improved trolley suspension.

With these and other objects in view, the invention resides in the novel features of construction and combinations and arrangements of parts, as more fully hereinafter set forth.

In the drawings:

Figure 1 is a side elevation of a carrier embodying the invention;

Figure 2 is a plan view thereof with parts broken away;

Figure 3 is an end view thereof;

Figure 4 is a plan view with parts broken away showing the hanger of the carrier in an adjusted position;

Figures 5, 6 and 7 are cross sections on the lines 5—5, 6—6 and 7—7, respectively, of Figure 1;

Figure 8 is a cross section on the line 8—8 of Figure 5.

The carrier, as illustrated in the present instance, is designed particularly to carry annular work elements, such as tire casings, while they are being processed. The carrier comprises the support 1 which is suspended from and movable along the monorail or single track 2 and the hanger 3 suspended from the work for engaging and carrying the tire casings, the hanger being positioned so that the tire casings may be mounted and removed from either side of the carrier and also positioned so that the tire casings may be sprayed or dusted from either side of the carrier and from below the carrier. The support 1 comprises the longitudinally movable supporting member 4 having the beam 5 and the trolleys 6 from which the beam is pivotally suspended. The trolleys are located at the ends of the beam and each trolley comprises the yoke 7 having upwardly extending arms, the yoke 8 having downwardly extending arms, the vertical pin 9 extending through the bases of the yokes and pivotally connecting these yokes to each other, the trolley wheels 10 at the upper ends of the arms of the yoke 7 and the horizontal bolts 11 extending through the arms of the yoke 8 and the brackets 12 secured to the beam 5 for pivotally connecting the yoke 8 to the beam. The arms of the yoke 7 embrace the lower flange of the monorail 2 and the trolley wheels 10 rest upon this flange and are movable therealong. The trolley suspension is such that the yokes of each trolley may move angularly relative to each other through a horizontal path so that the carrier may move around the horizontal bend in the monorail. The trolley suspension is also such that the beam of the carrier may swing through a path transverse to the path of angular movement of the yokes of each trolley. The supporting member 4 also comprises the relatively narrow plate 13 which is secured to and depends from the longitudinal central portion of the beam 5. This plate has the beveled edge portions 14 for facilitating entrance of the plate between guide rails at the top of a housing in which the hanger 3 is located and in which the processing steps, such as spraying and dusting, take place. By reason of the plate 13 being relatively narrow the slot between the guide rails is relatively narrow, thereby reducing the possibility of escape of the processing materials. 15 is a shaft also forming part of the supporting member, this shaft being secured to and depending from the plate 13 and angularly movably supporting the hanger 3 by means of the lower indexing head 16 and the upper indexing head 17. The lower indexing head is fixedly secured to the shaft as by means of the pin 18.

The hanger 3 comprises the body 19 which is fixedly secured to and carried by the upper indexing head 17 and the arms 20 which extend transversely of and at opposite sides of the body and are arranged in pairs at equal distances from the axis of the shaft 15 and in staggered relation. These pairs of arms are adapted to engage and support the tire casings and each arm is formed of a pipe extending through and preferably welded to the body and a plug preferably welded in the outer end of the pipe and extending upwardly to form the stop 21 for retaining the tire casing from accidental disengagement. The body 19 is in the nature of a frame formed of the frame members 22, 23 and 24 and the side plates 25. The frame member 22 is U-shaped and located between the side plates 25 and the base of its U rests on and is fixedly secured to the upper indexing head 17 as by means of welding. The frame members 23 are U-shaped and located between the side plates 25, each frame member 23 embracing a pair of arms 20. The frame member 24 is generally V-shaped and extends over the frame members 22 and 23 between the side plates 25 and abuts the outer flanges of the frame members 23. These frame members and side plates are all fixedly secured in place preferably by welding their abutting portions together.

The lower indexing head 16 is provided with the diametrically extending upstanding rib or bead 26, the central longitudinal plane of which extends parallel to and in the central longitudinal plane of the beam 5 and the monorail 2. The upper indexing head 17 has in its lower face the diametrically extending downwardly opening groove 27 for receiving the rib or bead 26. The central longitudinal plane of the groove 27 is at an angle of 35 degrees to the central longitudinal plane of the rib or bead 26 so that when the rib or bead is located in the groove the hanger will be angularly positioned relative to the support and monorail to position the axes and consequently the centers of gravity of the tire casings, as shown particularly in Figure 4, in the central longitudinal plane of the support and monorail. By reason of this construction the hanger and the support may both be placed in balance, regardless of whether one or more tire casings are being conveyed by the carrier.

For the purpose of locking the hanger in its angularly adjusted position, as determined by the indexing rib or bead and the indexing groove, the latch 28 is pivoted to the plate 13 and the latch collar 28' is fixedly secured to the frame member 24 of the hanger as by being welded thereto. The collar is provided with the groove 29 which is positioned to be engaged by the latch when the indexing rib or bead engages the indexing groove.

From the above description it will be readily seen that I have provided a construction of carrier which provides for mounting and removing the tire casings from either side of the carrier and also provides for spraying or dusting the tire casings from either side of and also from below the carrier, the hanger having its arms so arranged that the tire casings are staggered to facilitate these processing steps. It will also be seen that regardless of whether one or more tire casings are mounted on the hanger the hanger and also the support member may both be placed in balance so that neither will be tilted to one side or the other. It will be further seen that I have provided a simple, compact trolley suspension for the carrier providing for horizontal and vertical angular movement of the supporting member and at the same time have positioned the supporting member so that its top is below and relatively close to the monorail.

What I claim as my invention:

1. A carrier for work elements comprising a longitudinally movable support, a body suspended from the support and elongated in the general direction of movement of the support, work article supporting arms extending transversely of the path of travel of the support and projecting from opposite sides of the body in spaced relation to each other in the direction of length of the body, and means pivotally connecting the body intermediate the arms to the support enabling sufficient angular movement of the body relative to the support to position the work elements on the arms with their centers of gravity on substantially the central longitudinal plane of the support.

2. A carrier for work elements comprising a support movable along a predetermined path of travel, a body elongated in the general direction of movement of the support and pivotally mounted intermediate the ends on said support for swinging movement on an axis perpendicular to the path of travel of the support, an article supporting arm projecting laterally from one side of the body, a second article supporting arm projecting laterally outwardly from the opposite side of the body, said arms being spaced from each other lengthwise of the body at opposite sides of the axis of rotation of the body, and means for releasably holding the body in a position wherein the arms extend diagonally of the path of travel of the support.

CLARENCE H. WHITCROFT.

REFERENCES CITED

The following references are of record in the file of this patent:

UNITED STATES PATENTS

| Number | Name | Date |
|---|---|---|
| 1,152,564 | Smith | Sept. 7, 1915 |
| 1,417,528 | Irish et al. | May 29, 1922 |
| 1,871,608 | Hallinan | Aug. 16, 1932 |
| 1,930,607 | Brown | Oct. 17, 1933 |
| 2,052,748 | Bowers | Sept. 1, 1936 |
| 2,344,476 | Turnbull | Mar. 14, 1944 |

OTHER REFERENCES

Mathews publication entitled "Mathews Conveyers," "Engineering data and applications," copyright 1930, Mathews Conveyor Co., Elwood City, Pa.